United States Patent
Kolletzki (10) Patent No.: US 8,306,691 B2
(45) Date of Patent: Nov. 6, 2012

(54) ON-BOARD INTERACTIVE ELECTRONIC SYSTEM FOR A VEHICLE

(75) Inventor: Johannes Kolletzki, Eckental (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1181 days.

(21) Appl. No.: 11/256,675

(22) Filed: Oct. 20, 2005

(65) Prior Publication Data

US 2008/0077291 A1    Mar. 27, 2008

(30) Foreign Application Priority Data

Oct. 20, 2004  (EP) .................................. 04024943

(51) Int. Cl.
G06F 19/00    (2011.01)
(52) U.S. Cl. .............. 701/36; 701/50; 700/83; 345/173; 345/168; 345/156
(58) Field of Classification Search ............... 701/36, 701/33, 50; 700/85, 83; 345/173, 168, 156
See application file for complete search history.

(56) References Cited

U.S. PATENT DOCUMENTS

| | | | | |
|---|---|---|---|---|
| 5,469,356 A * | 11/1995 | Hawkins et al. | ................ | 701/48 |
| 5,794,164 A * | 8/1998 | Beckert et al. | ............... | 455/3.06 |
| 6,061,617 A * | 5/2000 | Berger et al. | .................... | 701/50 |
| 6,148,593 A * | 11/2000 | Heinsey et al. | ............ | 56/10.2 R |
| 6,210,279 B1 * | 4/2001 | Dickinson | ...................... | 463/37 |
| 6,334,081 B1 * | 12/2001 | Robinson et al. | ............... | 701/48 |
| 6,343,237 B1 * | 1/2002 | Rossow et al. | ................. | 700/83 |
| 6,377,860 B1 * | 4/2002 | Gray et al. | ...................... | 700/83 |
| 6,429,846 B2 * | 8/2002 | Rosenberg et al. | ........... | 345/156 |
| 6,542,789 B2 * | 4/2003 | Ufheil | ........................... | 700/275 |
| 6,553,290 B1 * | 4/2003 | Pillar | ........................... | 701/29.4 |
| 6,570,591 B1 * | 5/2003 | Crovetto et al. | .............. | 715/763 |
| 6,972,665 B2 * | 12/2005 | Wang et al. | ................ | 340/425.5 |
| 6,993,421 B2 * | 1/2006 | Pillar et al. | .................... | 701/29.4 |
| 7,099,722 B2 * | 8/2006 | Casey | ............................ | 700/85 |
| 7,117,075 B1 * | 10/2006 | Larschan et al. | ............. | 701/29.6 |
| 7,394,980 B1 * | 7/2008 | Richards | ........................ | 398/16 |
| 7,432,911 B2 * | 10/2008 | Skarine | ......................... | 345/168 |
| 7,522,979 B2 * | 4/2009 | Pillar | ........................... | 701/32.8 |
| 7,596,636 B2 * | 9/2009 | Gormley | ......................... | 710/8 |
| 7,728,820 B2 * | 6/2010 | Rosenberg et al. | ........... | 345/173 |
| 7,738,979 B2 * | 6/2010 | Schmuck et al. | ............... | 700/85 |
| 2003/0142066 A1 * | 7/2003 | Hejza Litwiller | ............. | 345/156 |
| 2003/0195699 A1 * | 10/2003 | Jones | ........................... | 701/201 |
| 2003/0200015 A1 * | 10/2003 | Pillar | ............................. | 701/33 |

(Continued)

FOREIGN PATENT DOCUMENTS

EP    0923021 A2    6/1999

(Continued)

*Primary Examiner* — Thomas Black
*Assistant Examiner* — Wae Louie
(74) *Attorney, Agent, or Firm* — The Eclipse Group LLP (57) ABSTRACT

An on-board interactive electronic system for a vehicle including an operating module with a plurality of operating elements for selecting a parameter of a plurality of parameters or a specific value of the parameter. The value and the parameter may be addressed by operating at least one operating element of the operating module. The on-board interactive electronic system includes a configuration module for determining a specific parameter or a specific value of the parameter that a user wants to address, and for assigning the parameter or the value to at least one operating element, so that the parameter or the value is addressed when the at least one assigned operating element is activated.

18 Claims, 3 Drawing Sheets

U.S. PATENT DOCUMENTS

| | | | |
|---|---|---|---|
| 2004/0143511 A1* | 7/2004 | Miller et al. | 705/26 |
| 2005/0177287 A1* | 8/2005 | Wang et al. | 701/36 |
| 2005/0283295 A1* | 12/2005 | Normann | 701/50 |
| 2006/0112685 A1* | 6/2006 | Devier et al. | 60/422 |
| 2006/0173594 A1* | 8/2006 | Kolletzki | 701/36 |
| 2008/0039983 A1* | 2/2008 | Oesterling et al. | 701/2 |
| 2008/0077291 A1* | 3/2008 | Kolletzki | 701/36 |
| 2008/0221776 A1* | 9/2008 | McClellan | 701/103 |
| 2010/0106367 A1* | 4/2010 | Kolletzki | 701/36 |

FOREIGN PATENT DOCUMENTS

| | | |
|---|---|---|
| EP | 0923021 A3 | 6/2000 |
| EP | 1403619 A1 | 3/2004 |
| JP | 10-308136 | 11/1998 |

* cited by examiner

ON-BOARD INTERACTIVE ELECTRONIC SYSTEM FOR A VEHICLE

RELATED APPLICATIONS

This application claims priority of European Patent Application Serial No. 04024943.5, filed Oct. 20, 2004, titled "ON-BOARD ELECTRONIC SYSTEM FOR A VEHICLE, VEHICLE MULTIMEDIA SYSTEM AND METHOD FOR CONFIGURING AN ON-BOARD ELECTRONIC SYSTEM", which is incorporated by reference in this application in its entirety.

BACKGROUND OF THE INVENTION

1. Field of the Invention

This invention relates to on-board interactive electronic systems for vehicles, and methods for configuring such on-board interactive electronic systems.

2. Related Art

On-board interactive electronic systems for vehicles, including multimedia systems and navigation systems, have become more complex, providing a variety of functions and features for the user. Often these interactive electronic systems include one or more modules, such as a radio module for listening to different radio stations, an audio module for listening to media (including CDs and tapes), a navigation module for guiding a driver to a predetermined destination, and/or a telecommunication module incorporating a cell phone. All of these modules have different parameters, features and functions that can be addressed and edited. In contrast, earlier generation interactive electronic systems often included only one or two modules, such as a radio module and an audio module. For addressing one of the functions of one of the different modules, the module in such an earlier generation electronic interactive system often included an operating button for each feature.

In recent years, these electronic interactive systems have become more complicated. Current interactive electronic systems are often controlled by a menu structure shown on a display. The menu is selected to address the different features and parameters or for one specific value of the different parameters. The item shown in the menu display is then chosen for addressing the item and for addressing the corresponding parameter or feature of the interactive electronic system. As a consequence, the operation of such an electronic interactive system has become complicated, and multiple steps have to be carried out in order to address one certain parameter of the interactive electronic system. Furthermore, some of the parameters can be separately addressed by two different operating elements of the operating module. In some multimedia systems, it is possible to change the frequency in a radio operating mode by turning either a turn button provided on the operating module, or by activating a rocker module provided on the operating module.

Accordingly, a continuing need exists for an on-board interactive electronic system for vehicles that provides for an easier means for addressing and/or adjusting certain parameters or parameter values, including, but not limited to, adjusting or redefining the use of one or more redundant operating elements.

SUMMARY

An on-board interactive electronic system is provided for a vehicle that includes an operating module with a plurality of operating elements for selecting a parameter of a plurality of parameters or a specific value of the parameter. The parameter or specific value of the parameter is selected and/or addressed by utilizing at least one operating element of the operating module. The on-board interactive electronic system includes a configuration module for determining a specific parameter or a specific value of the parameter that a user wants to address and for assigning the parameter or the value to at least one operating element, so that the parameter or the value is addressed when the at least one assigned operating element is activated.

A method is also provided for configuring an on-board interactive electronic system of a vehicle, the interactive electronic system including an operating module having a plurality of operating elements for selecting a parameter or a specific value of a parameter, the value or the parameter being addressed by operating at least one operating element of the operating module, including the steps of (i) determining a specific parameter or a specific value of a parameter to be addressed by utilizing the operating module, and (ii) assigning the parameter or the value to at least one operating element, so that the parameter or the value is addressed when the at least one assigned operating element is activated.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
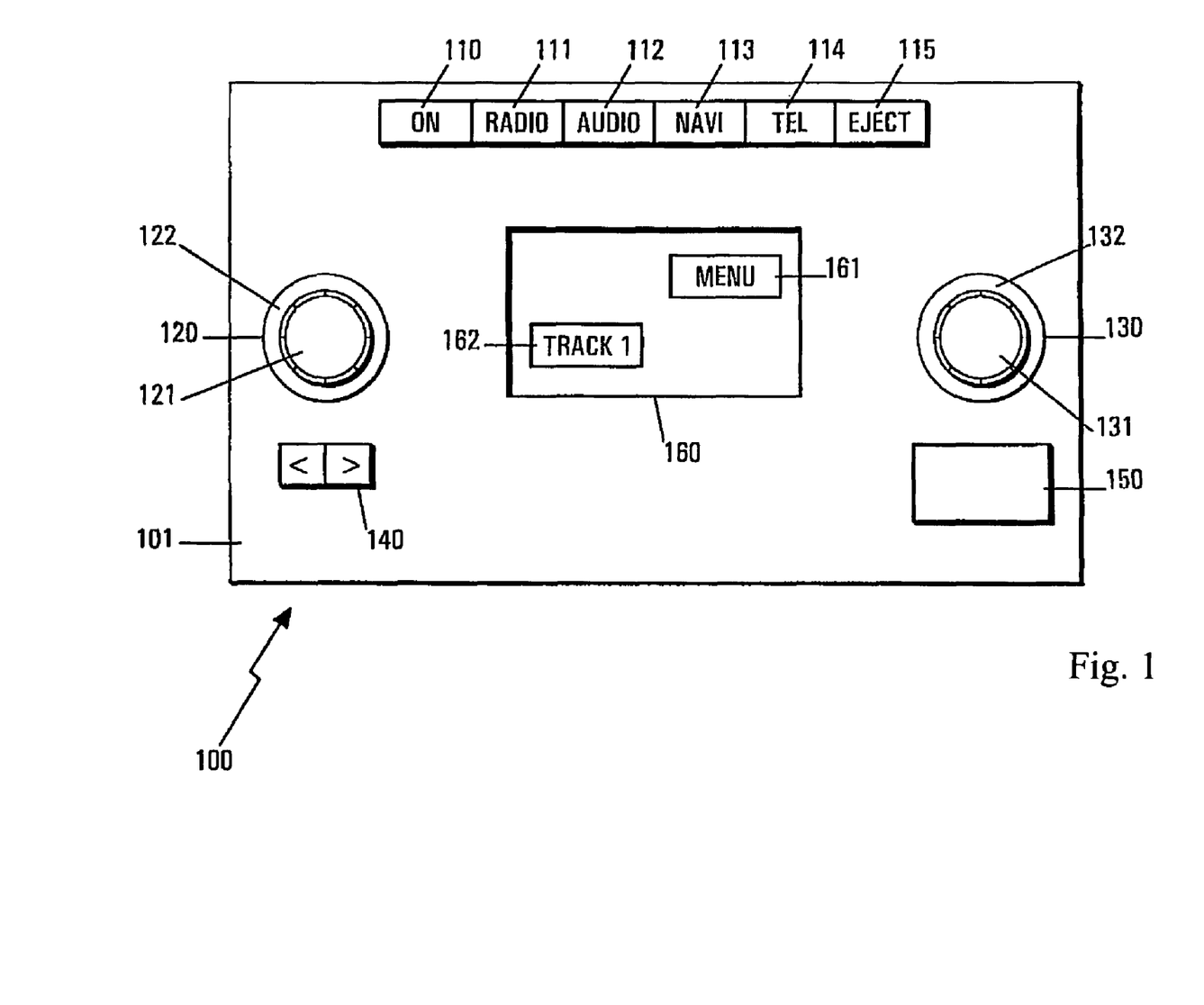
FIG. 1 shows a front view of an example of an implementation of an on-board interactive electronic system including multiple operating elements.

FIG. 1 shows an example of an implementation of an on-board interactive electronic system 100. The on-board interactive electronic system 100 may be in communication with a multimedia system that may be, as an example, incorporated into the dashboard of a vehicle. The on-board interactive electronic system 100 of FIG. 1 may include several different modules, such as a radio module, an audio module, a navigation module, and a telecommunication module. For enabling the different operating modes of the different modules, the on-board interactive electronic system 100 may include an operating module 101 on the front side of the interactive electronic system. The operating module 101 may include operating elements 111, 112, 113 and 114 that may be referred to as actuators and, as an example, may be implemented as press-buttons. The operating element 111 may be utilized for the radio operating mode, the operating element 112 may be utilized for the audio operating mode, the operating element 113 may engage a navigational system to be utilized when the driver chooses to be directed to a predetermined destination location, and operating element 114 may be utilized for the telecommunication operating mode. Furthermore, operating elements 110 and 115 may be respectively provided to turn the on-board interactive electronic system 100 on and off, and to eject a storage system element such as a CD-ROM or DVD. As examples, such storage system elements may be utilized in the navigation or audio modes. A loading slit, not shown, may be provided for introducing a storage medium into the on-board interactive electronic system 100.

The on-board interactive electronic system 100 may further include two combined operating elements 120 and 130. These combined operating elements 120 and 130 may be designed as combined turn- and press-buttons. These combined operating elements 120 and 130 may, as examples, include first parts 121 and 131 that may be utilized for pressing the combined operating elements 120 and 130, respectively. Furthermore, these combined operating elements 120 and 130 may, as examples, include respective parts 122 and 132 that may be utilized to turn the combined operating elements.

The on-board interactive electronic system 100 may include a rocker element 140 and a button element 150. Each of these elements 140 and 150 may address a specific parameter, or specific value of a parameter of the on-board interactive electronic system 100, when they are operated. The addressed parameter may be dependent upon which of various modes of the on-board interactive electronic system 100 is in operation. As an example, the rocker element 140 may be utilized to scan the frequency band when the on-board interactive electronic system 100 is working in the radio operating mode.

The term "parameter" or sub-system parameter indicates a feature or a function of the different modules or sub-systems of the on-board interactive electronic system 100. For example, sub-system parameters for a radio operating mode may include a frequency or a frequency band. Also as examples, sub-system parameters for an audio mode may include the sound volume or the number of tracks on a CD. Each of these parameters may have different values or different types of values. When the defined parameter is a radio frequency, then the different available frequency values of radio stations may be the specific values. When the defined parameter is a frequency band, then the respective values may be, as an example, very high frequency band, medium wave band and short wave band.

Furthermore, a display 160 may be included to inform the user of the current operating status of the on-board interactive electronic system 100. As an example, the display 160 may include a menu item 161 and a display item 162. Display item 162 may inform the user that track 1 of an audio CD is playing at the moment. The menu item 161 may help the user to enter a menu in which some or all of the different parameters, features and functions of the on-board interactive electronic system 100 may be edited. By entering the menu and by scrolling through the different items shown when the menu is entered, the user may define and select the different parameters of the on-board interactive electronic system 100. It is appreciated that the on-board interactive electronic system 100 may include many more items in addition to those shown on the display 160 or may utilize another way of informing the user as to which operating state of the system is working. Furthermore, it is appreciated that the on-board interactive electronic system 100 may include many other operating elements which may also be operated in completely different ways.

Each of the operating elements shown in FIG. 1 may address a different parameter depending on the operating mode in which the on-board interactive electronic system 100 is working. As an example, when the on-board interactive electronic system 100 is working in the radio or audio mode, part 122 of the combined operating element 120 may be utilized to control the sound volume, and the combined operating element 130 may be utilized for entering the menu and for editing the system and its parameters. In the different operating modes, several operating elements may also be utilized in redundant ways. As an example, in the radio operating mode the frequency band may be scanned by either operating the rocker element 140 or by operating the part 132 in order to change the selected frequency. Thus, a case may exist where one parameter or one value of a parameter may be separately addressed by two different operating elements. As a consequence, the user may wish to redefine the operation of one of the operating elements, so that another function or parameter of the on-board interactive electronic system 100 may be addressed by operating the operating element.

The on-board interactive electronic system 100 may further include a configuration operating mode that the user may access for determining a specific parameter, or a specific value of the parameter, that the user wants to address by utilizing the operating module 101. The configuration mode may further assign the parameter, or the parameter value, to at least one operating element, so that the parameter or the parameter value may be addressed when one or more assigned operating elements may be activated by the user. The configuration mode may provide a possibility for the user to define a parameter or a value of the parameter that may be addressed when one or a plurality of operating elements are activated, the operating elements to be utilized also being determined by the user. In the configuration operating mode, the user may define how the on-board interactive electronic system 100 may be operated for addressing one of the different parameters of the system.

The user may determine short-cuts for addressing a specific parameter or a specific value of a parameter in operation of the on-board interactive electronic system 100. The user may have the possibility of addressing and selecting any parameter, or any value of the parameter, by utilizing the defined shortcuts. When the user wants to frequently utilize a predetermined parameter in one of the operating modes, the user may not need to open a menu in the display 160 and to then scroll through the menu to select one item representing the parameter that the user wants to edit. Even if such a frequently-used parameter was not originally programmed to be addressable in one simple operating step by the designer of the interactive electronic system, the user may utilize the on-board interactive electronic system 100 to select an operating element with which the parameter may be addressed in one step or in a shortened series of steps.

For accessing the user-defined configuration mode of the on-board interactive electronic system 100, the user may enter a menu shown in the display 160, in which the different parameters and values of the on-board interactive electronic system 100 may be addressed and edited. By scrolling through the menu, the user may choose the parameter, or the value of the parameter, that he or she wants to address. In order to inform the on-board interactive electronic system 100 that the selected parameter or value has been chosen as a parameter that may be addressed by using a specific operating element or a specific combination of operating elements, the user may press a predetermined operating element. As an example, the user may inform the on-board interactive electronic system 100 of this choice by pressing a predetermined operating element for a predetermined amount of time. When the parameter that the user wants to select is shown on the display, and when the item representing the parameter is marked on the display so that the user knows that this item may be addressed, the user may then press a button for a predetermined amount of time. The system may then register that this parameter or value has been selected to be addressed by the user in a user-defined way.

Figure 2:
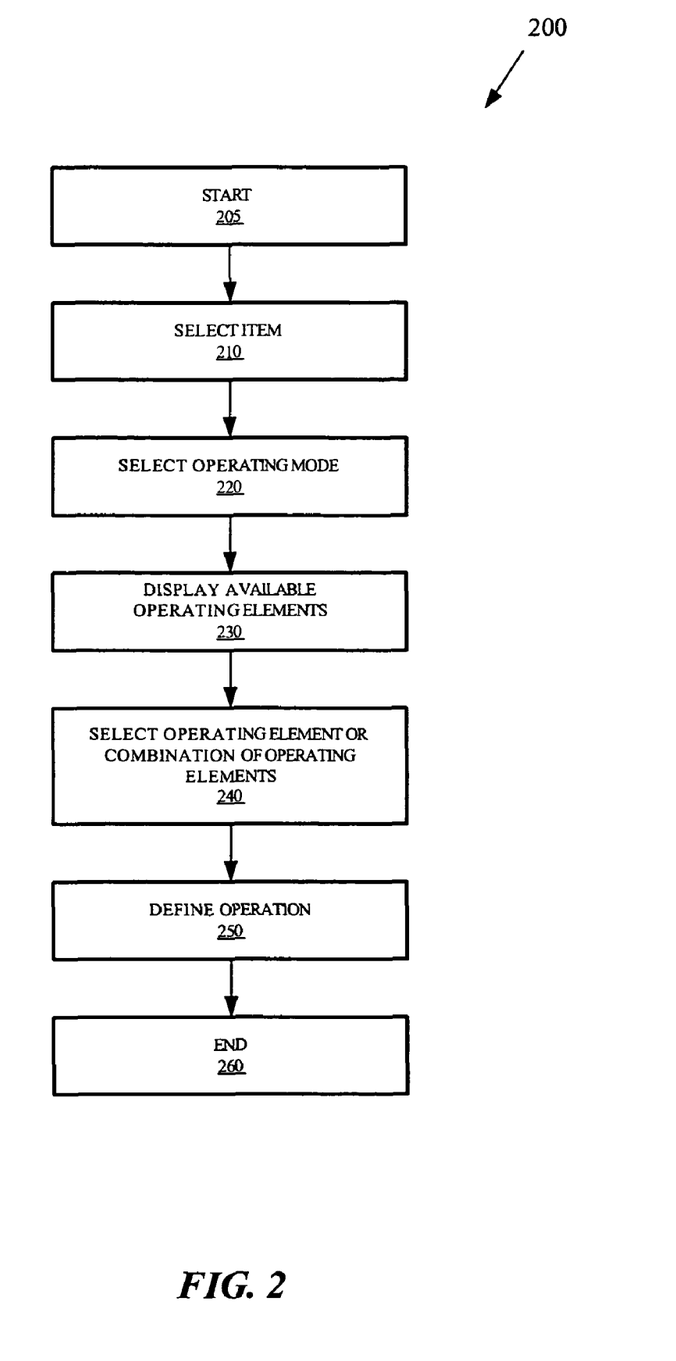
FIG. 2 shows a flowchart illustrating an example of one implementation of a method for configuring an on-board interactive electronic system in a user-defined way.

FIG. 2 shows a flowchart 200 including an implementation example of a method for configuring the on-board interactive electronic system 100 in a user-defined way. The method begins at step 205. At step 210, the user may enter the menu shown as menu item 161 of FIG. 1 and may then select the parameter that he or she wants to address by operating one or more of the operating elements in a predetermined way. As an example, the user may wish to address a certain frequency in order to listen to a certain radio program. The user may scroll through the menu, select the radio program item, and select the radio program out of a list of received radio programs that may be stored in the on-board interactive electronic system 100.

At step 220, the user may then define an operating mode in which the parameter selected at step 210 may be addressed by one or more user-defined keys. The user may predetermine the operating mode or modes in which the parameter or the value may be addressed by the user-defined operating element. The user may wish, as an example, that a specific user-defined operation of the operating elements for addressing a certain parameter may only be actuated in the radio operating mode. Alternatively, the user may wish to utilize a user-defined operation of an operating element in all of the operating modes of the on-board interactive electronic system. In that case, whenever the user operates the operating element in the predetermined way, the parameter may then be addressed independently of the operating mode.

By instead enabling the use of user-defined operating elements for actuating a user-defined parameter in dependence on the selected operating mode, the user may be able to further adapt the on-board interactive electronic system 100 according to the user's wishes. As an example, the user may wish to scan a radio frequency band or to jump from one radio station to the next radio station, or may wish to select a predetermined radio station when pressing a predetermined button. The user may wish these operations to be possible only in the radio operating mode. When the on-board interactive electronic system 100 is working in the navigation operating mode, as an example, the user may want the activation of these operations to not have the same consequences. As an example, the predetermined radio station may not then be activated. However, the user may also choose to address the radio program when the on-board interactive electronic system 100 is working in an audio or navigation operating mode, when the user has pressed controls in the operating module 101 in a predetermined way as explained in the next steps.

When the user has determined which parameter may be addressed in a selected operating mode, the on-board interactive electronic system 100 may display at step 230 the available operating elements from which the user may select for addressing the parameter that was selected at step 210. At step 240, the user may select an operating element or a combination of operating elements that, when utilized, may address the parameter that was selected at step 220. As an example, the user may determine how a radio program that was selected at step 220 may be addressed, so that the user may choose this radio program.

The process of assigning a parameter or a value to at least one operating element in step 240 may also be carried out, as an example, in the following way. When the user has determined the parameter or the value of the parameter that the user wants to address by utilizing the operating module, he or she may press an operating element or a combination of operating elements in a predetermined way for the purpose and with the effect of defining how the parameter or the value may then be addressed by the on-board interactive electronic system 100. The user assigns the parameter to the operating element or elements by the act of operating the element or elements as intended for addressing the parameter, so that the system learns the combination of operating elements from the user.

At step 250, the user may define a change in the selected parameter that may be made by utilizing the operating elements that were selected at step 240. As an example, the user may have selected a certain radio program at step 210. After determining at step 240 the operating elements that may be utilized to address the radio program, the user may need to define an end-use for the chosen radio program As an example, the user may wish to select the radio program, so that it may be broadcast over loudspeakers of the on-board interactive electronic system 100. As an alternative example, the user may also wish the selected radio program to be utilized for obtaining traffic information. The radio program may also be utilized, as an example, for electronic filtering of another audio signal. It is appreciated, as an example, that step 250 may also be carried out directly after step 210 before selecting the operating mode at step 240. Depending on whether the selected parameter has various different values or whether different functions may be carried out with the selected parameter, the function itself may need to be determined.

Step 250 may further include displaying at least some of the possible values of a parameter, when the parameter has been assigned to at least one operating element. The user may also choose whether a parameter may itself be addressed, or whether a particular value of the parameter may be addressed, when the operating elements may be operated as defined by the user. When the user has decided to address a parameter and not one of the values of the parameter, then the system may display some of the possible values or all possible values. As an example, when the user has decided to address and to select a radio frequency parameter or a radio stations parameter by pressing a predetermined operating element, the method may enable the system to be configured in such a way as to link the system to an operating mode in which the frequency or the radio stations may be edited. In order to edit the parameter values, the values may then be displayed. The user may, as an example, have defined that the possible frequencies in the frequency band may be displayed when the user has pressed a predetermined operating element. When the frequencies are displayed, the user may then have the possibility of scanning the frequency band by operating the predetermined operating element again, or by operating another operating element. If, however, the user has configured the system in such a way that a certain frequency, on which a certain radio program is broadcast, may be selected when the operating module is operated in the predetermined way, then the user has already selected the value itself.

Step 250 may also include configuring the operating module to be operated in a particular way determined by the user for selecting an addressed parameter. As an example, the user may have selected a parameter having two possible values, either of which may be addressed when the operating module is operated in the way determined by the user for selecting the addressed parameter. When the parameter has only two possible values, the user may wish to toggle between the two parameter values whenever he or she operates the predetermined operating element or the predetermined combination of operating elements. Additionally, in order to determine the operation that the on-board interactive electronic system 100 may carry out, the user may determine whether he or she only wants to select the parameter, or whether he or she wants to edit the parameter and change its value. As an example, instead of toggling between the values, the user may wish to always enable or disable the function of the parameter. In the case when the selected parameter is the traffic channel as an example, the user may also configure the system in such a way that the search for a traffic channel either is always enabled or is always disabled when the predetermined operating element is activated. The method ends at step 260.

Figure 3:
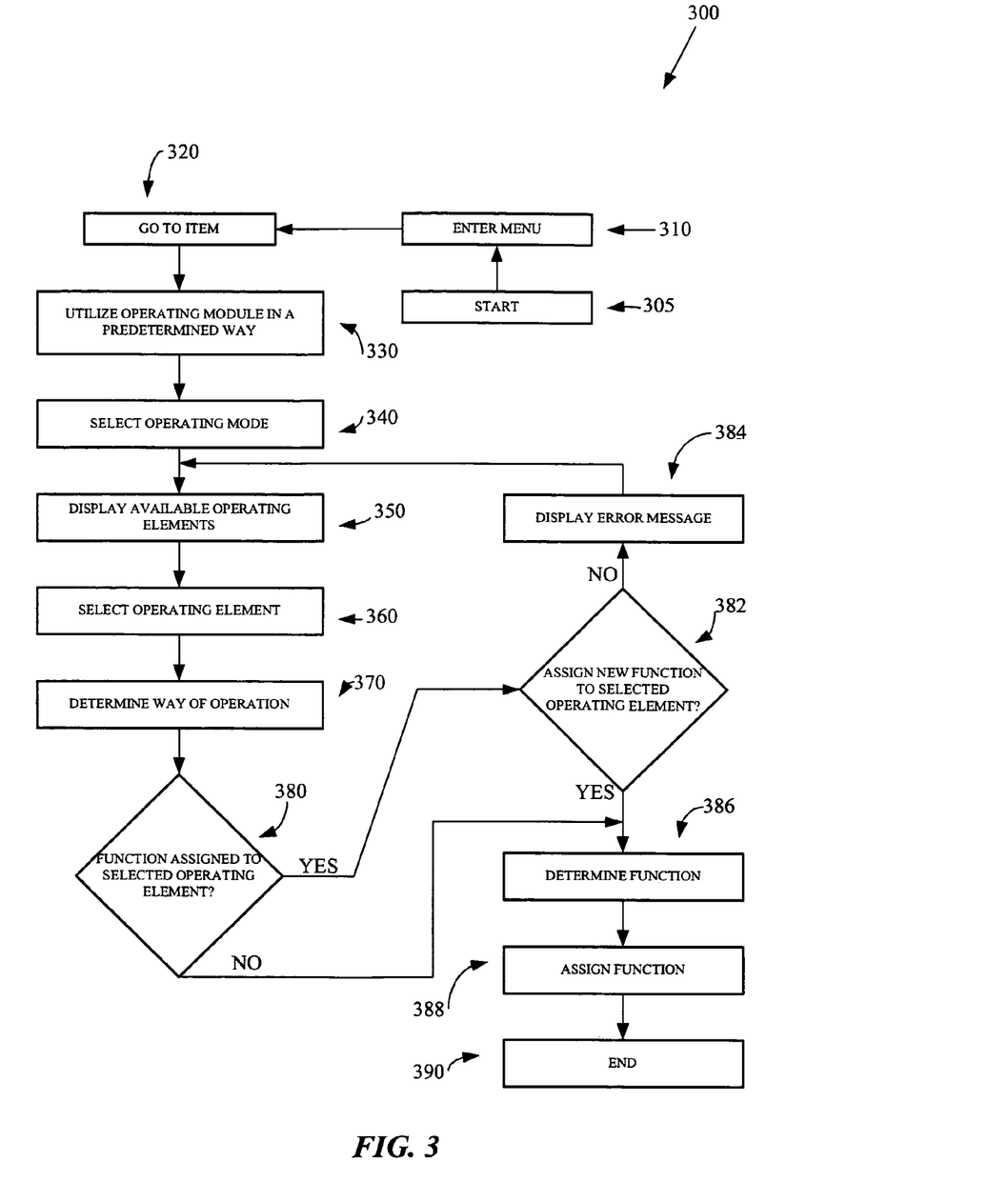
FIG. 3 shows a flowchart illustrating an example of another implementation of a method for configuring an on-board interactive electronic system.

FIG. 3 shows a flowchart 300 including another implementation example of a method for configuring the on-board interactive electronic system 100. The method 300 starts at step 305. By then selecting an item or a parameter at step 310 that the user wants to address, he or she may enter a menu. Step 310 may be carried out by operating one of the operating elements of the operating module 101 shown in FIG. 1 in a predetermined way. The menu may be entered, as an example, by being marked and thus selected in the display, 160 so that the different items of the menu are shown in the display. The user may then scroll through the menu at step 320 to the item representing the parameter that he or she wants to address. In order to enter the configuration operating mode for the on-board interactive electronic system 100, as an example, the user may utilize the operating module 101 in a predetermined way at step 330. When the parameter to be addressed is then marked on the display 160, the user may press a predetermined operating element for a predetermined amount of time, so that the on-board interactive electronic system 100 registers that the user wants to assign a specific operating element or a combination of specific operating elements to control the selected parameter.

At step 340, the user may further select an operating mode in which the selected operating element may have a selected assigned function. Step 340 corresponds to step 220 discussed above in connection with FIG. 2. At step 350, the operating elements available for controlling the selected operating element may be displayed. At this step 350, as an example, the display 160 may display operating elements that, in the operating mode selected at step 340, address no parameter or no value of a parameter when being operated. The on-board interactive electronic system 100 may furthermore display operating elements that are in redundant use. As an example, two operating elements may address the same parameter or the same value of a parameter. The on-board interactive electronic system 100 may additionally display the operating elements or the combinations of operating elements, to which a predetermined parameter has already been assigned for utilization when the on-board interactive electronic system 100 is being operated. As an example, a parameter may have been assigned during the system manufacturing process by the designer of the on-board interactive electronic system 100, or previously by a user during use. The display 160 may differentiate further between designer-assigned operating elements and user-assigned operating elements.

At step 360 an operating element or a combination of operating elements may be selected. As an example, the operating element or the combination of operating elements shown on the display 160 at step 350 may be marked and selected. As another example, the operating element or the combination of operating elements that the user wants to utilize to address the parameter determined at step 320 may be pressed or operated.

At step 370 the user may define how a selected operating element or combination of operating elements selected at step 360 may be utilized. As an example, different operating elements may have different ways of operation, depending on the design of each operating element. If as an example a given operating element is a button, the button may be operated with a long press, with a short press, or a double press. As another example, when the operating element is operated by being turned, the user may turn it to the right or to the left. The selection of an operating way for the operating element may be made by choosing one of the possibilities shown on the display 160 for operating the operating element that was selected in step 360. As another example, the selected operating element may be directly operated in the way that the user wants to be able to utilize for addressing a selected parameter or a function.

In step 380, a "YES" or "NO" determination may be made as to whether there is already a function assigned to the selected operating element or the selected combination of operating elements. Referring back to step 350, the operating elements which already had a user-defined function may have been displayed. Furthermore, operating elements for which two different operating elements addressed the same function may also have been displayed in step 350. At step 380, the user may then reassign a previously-assigned parameter or function to control a different operating element.

If a "YES" decision was made at step 380 indicating that the operating element selected in step 360 already addressed a parameter, then at step 382 a determination may be made whether the new function or the new parameter may be assigned to the operating element that was selected at step 360. As an example, if the user wants to overwrite an earlier made parameter selection for the operating element selected at step 360, then he or she may make a "YES" selection at step 382 in the flowchart 300 shown in FIG. 3. The on-board interactive electronic system 100 may then display a message to "assign new function". As another example, the user may make a "NO" decision at step 382 if he or she does not want to overwrite a previously selected parameter. The on-board interactive electronic system 100 may then display an error message at step 384. If the user selects "NO" at step 382, meaning that the user does not want to overwrite a previously assigned function for the operating element selected at step 360, then the on-board interactive electronic system 100 may return to step 350 where the available operating elements may then be displayed to the user. The user may then reselect a new operating element or a new combination of operating elements at step 360 that may be operated to address the parameter or the value of the parameter that was determined at step 320.

If a "NO" decision was made at step 380 because no function was previously assigned to the operating element selected in step 360, or if a "YES" decision was made at step 382, then the method 300 may continue at step 386. At step 386, the function to be carried out by the operating element selected at step 360 may itself be determined. As an example, there may be several function possibilities or values for a parameter that was selected at step 320. As an example, when a certain radio program is selected, a further decision may then be made regarding what to do with the radio program, as was previously explained. As a further example, a parameter determined at step 320 may be the item, traffic channel parameter. A decision may then be needed as to what function regarding the traffic channel parameter may be executed. The user may then enable the traffic channel parameter, so that a selected radio program includes traffic news. Alternatively, the user may then disable the traffic channel parameter. As a further example addressing the traffic channel parameter at step 386, it may be determined there whether, when the selected operating element or the selected combination of operating elements is operated, the value of the traffic channel may be toggled. When the traffic channel parameter is in an enabled state, pressing the operating element or elements in the predetermined way may disable the traffic channel parameter. In an alternative example, pressing the selected operating element or elements in the predetermined way may always disable the traffic channel parameter, or always enable it. Where there are different possibilities for the parameter selected at step 320, the user may determine which possibility may be selected or what function may be carried out by pressing a selected operating element or elements in a predetermined way. Once the function or parameter is determined in step 386, the function may be assigned to the operating element or the operating elements at step 388. The method 300 then ends at step 390.

By practicing the method 300 shown in FIG. 3, the user may select a parameter, or a value of a parameter, that he or she wants to address. Furthermore, the user may determine how to operate the operating elements in order to address the selected parameter or the selected value.

The on-board interactive electronic system 100 may help a user to customize the electronic functions and parameters in a vehicle. The space provided for different operating elements in vehicles is limited, so that the existing functions and features of the electronic on-board systems may be addressed by reducing the need to go through multiple different menus, thus simplifying the operation of such a system. Utilizing the on-board interactive electronic system 100, the user may be able to address one important parameter, or a parameter that may be frequently used, in a way to be determined by the user. The user may, as an example, define shortcuts to address the parameter so that the handling of the on-board interactive electronic system 100 may be made easier and more comfortable for the user.

Furthermore, the on-board interactive electronic system 100 may be customized to different users. When entering the vehicle, the user may inform the on-board interactive electronic system 100 regarding which of several users is operating the interactive electronic system at the moment. As a consequence, the on-board interactive electronic system 100 may be configured in such a way so that shortcuts that were defined by the present user are available in the system. Another user may have selected other combinations of operating elements to be assigned to other functions, so that each user may operate the on-board interactive electronic system 100 according to the needs of the respective user.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A method for configuring an on-board interactive electronic system to control operation of a plurality of sub-systems in a vehicle, the interactive electronic system including an operating module having a plurality of actuators for selecting a sub-system parameter or a specific value of a sub-system parameter corresponding to a selected function or feature of at least one of the sub-systems by operating at least one actuator of the operating module, the method comprising:
   determining a specific sub-system parameter or a specific value of a sub-system parameter to be addressed using the operating module, and
   reassigning during operation the sub-system parameter or the value to at least one actuator, so that the sub-system parameter or the value is selected when the reassigned at least one actuator is activated.

2. The method of claim 1, further comprising:
   determining and reassigning the sub-system parameter or the value to at least one actuator by using a configuration operating mode.

3. The method of claim 1, further including the steps of:
   entering a menu to select and edit the different sub-system parameters and the values of the interactive electronic system, by choosing the sub-system parameter or the value of the sub-system parameter, and
   programming the sub-system parameter or the value to be addressed by utilizing a selected sub-system.

4. The method of claim 3, where the user presses the actuator or the combination of actuators in a predetermined way for defining how the sub-system parameter or the value is to be addressed.

5. The method of claim 1, further including the step of selecting a sub-system in which the sub-system parameter or the value are addressed when the reassigned at least one actuator is operated.

6. The method of claim. 1, further including the step of informing the user as to which actuators or which combination of actuators are available to address the sub-system parameter or the value of the sub-system parameter.

7. The method of claim 6, where the step of informing the user of the available actuators includes the step of informing the user of actuators that in the selected sub-system, address no sub-system parameter or no value of a sub-system parameter when being operated.

8. The method of claim 6, where the step of informing the user of the available actuators includes the step of informing the user of multiple actuators that address the same sub-system parameter or the same value of the sub-system parameter.

9. The method of claim 6, where the step of informing the user of the available actuators includes the step of informing the user of operating devices that already address one of the sub-system parameters or one of the values of the sub-system parameter.

10. The method of claim 6, further, including the step of informing the user as to the possible ways of operating an actuator.

11. The method of claim. 1, further including the step of displaying values of the sub-system parameter.

12. The method of claim 1, further including the step of determining the operation to be carried out on the selected sub-system parameter or value when, the sub-system is operated.

13. The method of claim 1 further comprising:
   selecting one of the plurality of sub-systems for operation from a group consisting of an audio module, a telecommunication module, a radio module, and a navigation module by activating a mode actuator corresponding to the sub-system.

14. The method of claim 13 where the step of determining a specific sub-system parameter or a specific value includes:
   where the sub-system is a radio or audio module, selecting from a plurality of radio or audio functions or from a plurality of radio or audio function values;

where the sub-system is a telecommunication module, selecting from a plurality of telecommunications functions or from a plurality of telecommunication function values;

where the sub-system is a navigation module, selecting from a plurality of navigation functions or from a plurality of navigation function values.

15. The method of claim 14 where the plurality of radio or audio functions includes a radio frequency having a function value that includes a specific radio frequency.

16. An on-board interactive electronic system for controlling operation of a plurality of sub-systems in a vehicle, the on-board interactive electronic system comprising:

an operating module having a plurality of actuators for selecting a sub-system parameter from a plurality of sub-system parameters or for selecting a specific value of the sub-system parameter; and a configuration module configured to select during operation a specific sub-system parameter or a specific value of the sub-system parameter to address by utilizing the operating module, and to reassign the sub-system parameter or the value to at least one actuator, so that the sub-system parameter or the value is addressed when the reassigned at least one actuator is activated.

17. The system of claim 16, further including a display on which a menu is displayed, the menu including sub-system parameters and values that can be addressed and edited.

18. The system of claim 16, where the plurality of sub-systems include any member selected from the group consisting of an audio module, a telecommunication module, a radio module, a navigation module, and any combination thereof.

* * * * *